July 13, 1937. L. G. FREEMAN, JR 2,087,186
PUNCH
Filed April 27, 1936
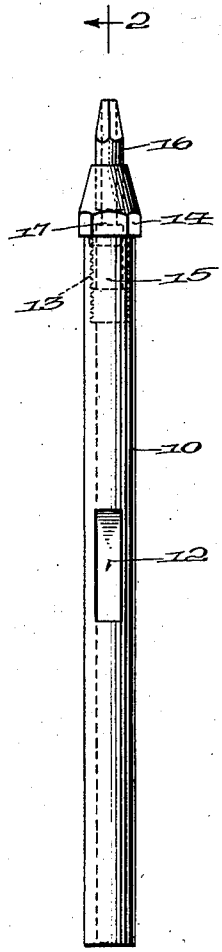
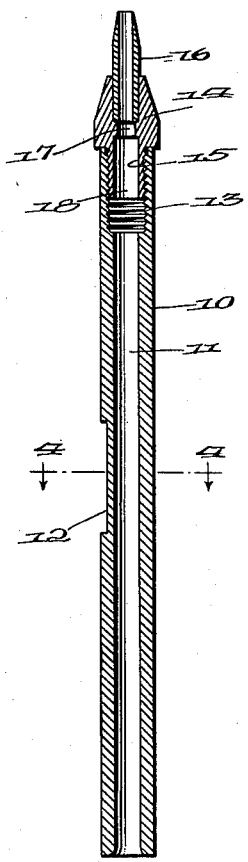
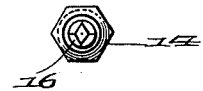
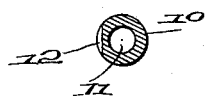
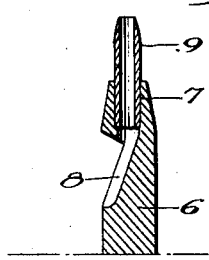
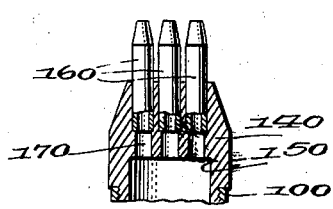
Inventor
Louis G. Freeman, Jr.
By Riordan & Riordan
Attorney Patented July 13, 1937

2,087,186

UNITED STATES PATENT OFFICE 2,087,186

PUNCH

Louis G. Freeman, Jr., Cincinnati, Ohio, assignor to The Louis G. Freeman Company, Cincinnati, Ohio, a corporation of Ohio Application April 27, 1936, Serial No. 76,656

17 Claims. (Cl. 164—124)

This invention relates to punches, and more particularly to improvements in hand punches of a type utilizing perforating tubes of various sizes and styles, for use principally in punching out paper patterns, in the making up of new designs in patterns of various kinds, in the formation of designs in shoe uppers, and for other purposes.

The main objection to punches of this nature, as known in the art, is the tendency of the chips or cuttings to clog, resulting in a necessary replacement of the perforating tube used in the punch. Ordinarily it is quite difficult to remove the perforating tube and insert a new one, and in some instances the clogging of the chips will cause the tube to break; if this does not occur the tube is liable to damage in removal and replacement. Further, if the tube is clogged, a satisfactory perforation of the work will not be obtained.

Punches of this type as heretofore used, generally comprise a solid shank formed with a socket at one end to receive a relatively small, hollow perforating tube of the desired configuration, the shank being recessed or cut away at the base of the socket, such that in normal operation the cuttings or chips will pass through the tube and out the base of the socket at the cut away portion.

The present invention contemplates as a primary object, the provision of a structure which will minimize clogging in the first instance, and in which the tube is readily and quickly replaceable when desirable or necessary.

Another object is to so form the shank as to strengthen the punch at points which would otherwise be susceptible to breakage.

In accordance with the invention, the shank of the punch is made hollow or tubular to receive the cuttings, with an internal diameter greater than that of the tube, thus minimizing chances of clogging and avoiding danger of breakage by cutting away any portion of the shank. The socket portion of the shank which receives and supports the perforating tube is formed as a detachable head, removable from the shank proper, thereby permitting quick replacement of the tube. The tube which heretofore has been wedged, driven or sweated into the socket of the shank may be similarly secured to the removable socket portion or head, and the head can be screw threaded into the shank. Removal of the entire head with its tube from the shank may be effected with very little effort and an entire new unit substituted therefor, or, because of the reduced length of the socket portion proper, as contrasted with the shank, access is readily obtained to the rear end of the tube proper, thus facilitating removal of the tube from the head.

To the attainment of the above and other objects, which will appear as the description proceeds, reference may be made to the accompanying drawing, in which:—

Fig. 1 represents a vertical elevation of the improved punch completely assembled;

Fig. 2 is a vertical section thereof on the line 2—2 of Fig. 1;

Fig. 3 is a plan of the tube end of the punch;

Fig. 4 is a section on the line 4—4 of Fig. 2;

Fig. 5 is a view similar to Fig. 2, but slightly enlarged and illustrating a multiple tube punch; and Fig. 6 is a view illustrating conventional practice, presented for comparative purposes with Fig. 2.

Referring more particularly to the drawing in which like reference numerals designate like parts, and with particular reference to Fig. 6 which illustrates the type of structure known to the prior art, it will be seen that conventional punches comprise a shank 6 having a hollow socket portion 7 terminating in a cut away or recessed portion 8, and a perforating tube 9 frictionally secured in the portion 7. Of course, the interior of the socket portion 7 will be suitably shouldered to resist inward movement of the tube 9, the shoulder being of such a dimension as to permit engagement with the tube of any suitable tool for "knocking out" the tube when necessary. In use the chips or cuttings pass through the tube 9 and out through the recessed portion 8.

The improved punch of the present invention comprises a shank 10 having a hollow interior 11, which extends from end to end of the shank, the shank being provided with a flattened portion 12 by means of which the punch may be held against rotary movement. This portion also forms a convenient place for marking the punch with any suitable indicia.

The hollow interior 11 of the shank 10 is enlarged and threaded at one end as indicated at 13 to receive a collet or removable head, providing a socket portion 14. The threading at 13 begins slightly below the end of the shank, to form a shoulder for the head, thus permitting a tight joint, without binding.

This head is formed with a stem 15 externally threaded to fit the end portion 13. A perforating tube 16 of any desired configuration, illustrated in the present embodiment as of diamond shape, is secured in the head or socket portion 14.

It will be observed that the normal internal diameter of the shank, while slightly smaller than that of the threaded portion 13, is nevertheless greater than the greatest internal diameter of the tube 16.

The head 14 is perforated as at 17 to a diameter substantially coincident with the hollow interior of the tube 16, (actually it is slightly larger in order to permit removal of the tube 16 by any suitable "knock out tool", as in the case of the form illustrated in Fig. 6) in order to provide shoulders for the tube 16, such perforation 17 merging into an interior 18 of a larger diameter, coincident with the interior 11 of the shank 10. This arrangement, by producing an opening for the reception of the chips which is greater than the chips themselves, facilitates immediate removal of the cuttings or chips, functioning in the same manner as the recess 8 referred to in connection with Fig. 6, without, however, weakening any portion of the punch.

In Fig. 5 a modification is illustrated, in which a plurality of tubes may be utilized, as distinguished from the single tube 16. In this form the tubes 160 are inserted in suitably formed sockets, which merge into interior perforations 170 corresponding to perforations 17. The plurality of perforations 170 merge into the hollow interior of the stem 150, and the entire head or socket portion 140 is screw threaded into a shank 100, all as described in connection with the single tube form.

Having thus described the invention the advantages thereof will be readily apparent. When quick replacement of a tube is required the unit consisting of the head 14 and tube 16 can be readily removed, the head being provided with flattened sides for the reception of a vise or a wrench. Inasmuch as the length of the head 14 is considerably less than that of the entire shank, ready access is afforded to the tube for removal thereof from the head. If any breakage should occur the entire punch is not rendered useless as would be the case in the event of breakage of the head or socket portion 7 from the shank 6 illustrated in Fig. 6.

The hollow shank avoids need for weakening any part of the punch, as by cutting a recess such as the portion 8 of Fig. 6.

Having thus described my invention, what I claim as new and desire to secure by Letters Patent of the United States is:—

1. In a punch of the class described, a tubular shank, a tubular head detachably mounted thereon and communicating with the interior thereof and terminating in a perforating tube.

2. In a punch of the class described, a tubular shank, a tubular head including a perforating tube socket, detachably mounted thereon and communicating with the interior thereof, and a hollow perforating tube mounted in said socket.

3. In a punch of the class described, a tubular shank, a tubular head detachably mounted thereon and communicating with the interior thereof and terminating in a hollow perforating member, and means in said shank to receive and guide cuttings from said perforating member.

4. In a punch of the class described, a tubular shank, a tubular head including a perforating tube socket, detachably mounted thereon and communicating with the interior thereof, a hollow perforating tube mounted in said socket, and means in said shank to receive and guide cuttings from said perforating tube.

5. In a punch of the class described, a tubular shank, a tubular socket portion detachably mounted thereon and communicating with the interior thereof and a perforating tube in said socket portion, the internal diameter of said tubular shank being greater than the internal diameter of said perforating tube.

6. In a punch of the class described, a tubular shank, a tubular socket portion detachably mounted thereon and communicating with the interior thereof and a perforating tube in said socket portion, the internal diameter of said tubular shank being greater than the internal diameter of said perforating tube, and the internal diameter of said socket portion being approximately coincident at one end with that of the tube, and enlarged at the other end to coincide with the internal diameter of the shank.

7. In a punch of the class described, a tubular shank, a socket portion detachably mounted thereon and communicating with the interior thereof and a perforating member in said socket portion, said socket portion and shank being threaded for attachment to each other, and said perforating member being separable from said socket portion.

8. In a punch of the class described, a tubular shank, a tubular socket portion detachably mounted thereon and communicating with the interior thereof and a perforating tube in said socket portion, the internal diameter of said tubular shank being greater than the internal diameter of said perforating tube and the greatest dimension of cuttings entering said perforating tube, whereby said cuttings will readily free themselves from the tube.

9. In a punch of the class described, a tubular shank, a socket portion detachably mounted thereon and communicating with the interior thereof and a perforating member in said socket portion, said shank being provided with a flattened portion for the reception of indicia.

10. In a non-clogging hand punch comprising a tubular shank, a hollow head member and a removable perforating tube carried by said head member said head member communicating with the interior of said shank, the hollow interior of said shank and a portion of said head being of greater diameter than the internal diameter of the remainder of said head and of said tube.

11. In a non-clogging hand punch comprising a tubular shank, a hollow head member and a perforating tube carried by said head member said head member communicating with the interior of said shank, the hollow interior of said shank and a portion of said head being of greater diameter than the internal diameter of the remainder of said head and of said tube, and readily detachable means connecting said head and tube as a unit to said shank, whereby said tube may be readily replaced.

12. In a punch of the class described, a tubular shank, a head detachably mounted thereon and communicating with the interior thereof and terminating in a plurality of perforating members.

13. In a punch of the class described, a tubular shank, a head, including a plurality of tube sockets, detachably mounted thereon and communicating with the interior thereof, and a perforating tube mounted in each of said sockets.

14. In a punch of the class described, a tubular shank, a head detachably mounted thereon and communicating with the interior thereof, and terminating in a plurality of perforating members, and means common to all of said perforating members to receive and guide cuttings into said shank.

15. In a punch of the class described, a tubular shank, a head including a plurality of tube sockets, detachably mounted thereon and communicating with the interior thereof, a perforating tube mounted in each of said sockets, and means common to all of said tubes and sockets to receive and guide cuttings into said shank.

16. In a punch of the class described, a shank, a hollow head detachably mounted thereon and terminating in a perforating tube, said shank having a hollow, chip receiving portion in communication with said head.

17. In a punch of the class described, a shank, a hollow head detachably mounted thereon and terminating in a perforating tube, said shank having a hollow, chip receiving portion in communication with said head, the internal diameter of said hollow, chip receiving portion being greater than the internal diameter of said tube.

LOUIS G. FREEMAN, Jr.